July 29, 1969     M. GELLER ET AL     3,458,830

TRANSMISSION LINE GAS LASER

Filed Oct. 18, 1966

INVENTORS
MYER (NMI) GELLER
DANIEL E. ALTMAN
BY
ATTORNEYS

United States Patent Office 3,458,830
Patented July 29, 1969

3,458,830
TRANSMISSION LINE GAS LASER
Myer Geller and Daniel E. Altman, San Diego, Calif., assignors to the United States of America as represented by the Secretary of the Navy
Filed Oct. 18, 1966, Ser. No. 588,249
Int. Cl. H01s 3/22
U.S. Cl. 331—94.5
10 Claims

ABSTRACT OF THE DISCLOSURE

A pulsed gas laser assembly is connected to a source of electrical energy through a switch means and a transmission line of predetermined electrical characteristics. The gas laser assembly has electrodes communicating with its interior and an electrically conductive sheath substantially enclosing the laser is connected to at least one of the electrodes. When the switch means is rendered conductive, the laser assembly including the electrodes, external sheath, and gas within the laser, operate in the manner of a continuation of the transmission line, the electrical characteristics having been selectively predetermined relative to the electrical characteristics of the transmission line so as to minimize impedance to the rate of increase of electrical current flow to the laser electrodes increasing the efficiency and rise time of the pulsed electrical energy.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention is concerned with a novel type of pulsed gas laser and more particularly a pulsed gas laser arranged, designed, and conceived so that the electrically connected elements which impress electrical energy upon the gas laser material are configured to perform in combination substantially in the manner of a transmission line.

In the past, conventional pulsed gas lasers have generally been powered and excited by charging a capacitor to a high voltage and then causing the charged capacitor to be discharged across the electrodes of a gas plasma tube. This technique of impressing electrical energy upon gas lasers has a number of disadvantages and is relatively inadequate and inefficient, even at best performance, for certain types of lasers exhibiting laser action of the type characteristic of molecular nitrogen.

It has been known for several years that laser action may be generated in a second positive band system of molecular nitrogen at approximately 3,371 A. during a fast rising, high-current, high-voltage discharge. However, the radiative lifetime of the second positive band system of molecular nitrogen (also known as its upper laser level) is relatively short, being of the order of forty nanoseconds. Additionally, the time it takes for the molecule to return from the lower laser level to the ground state is many times longer in duration than the radiative lifetime of the laser transition. Thus, the nitrogen molecules tend to pile up in the metastable level.

A second characteristic of a system of the molecular nitrogen type is that it cannot be operated in a continuous wave mode. Furthermore, once a molecule has reached the lower laser level, it cannot participate further in the radiation output of the laser pulse until sufficient time has permitted it to reach the "ground" state. However, if a molecule collides with the wall it can contribute to the next laser pulse.

These known factors fundamentally require that the excitation mechanism in the form of the electrical pumping or electrical energization of the laser must be completed in a time much shorter than the known radiative lifetime at the upper level, i.e. forty nanoseconds for the nitrogen laser. Failure to meet this basic requirement will prevent obtaining a desirably large population inversion as is known can occur from the phenomenon of molecular activity. The requirement of completing the electrical pumping of the laser in an extremely short radiative lifetime of the order of forty nanoseconds necessitates an extremely large rate of rise of current at the start of the pumping pulse.

In employing conventional laser systems using storage capacitors and conventional electrical conductors for connections, the inductive value of such configurations pose a major problem and disadvantage inasmuch as the voltage drop caused by such inductive reactance can be quite considerable. The effect of such inductive reactance is to stretch out the current pulse to the point where current is still rising well beyond the trailing edge of the radiative laser pulse. Thus, because of such inherent and residual inductances, it is extremely difficult, costly and inefficient to design a conventional capacitive discharge circuit for electrically pumping pulsed lasers such as that of the nitrogen type.

Improved laser performance has been realized through the use of prior art gas lasers of the type disclosed by Donald A. Leonard as described at page 4 through 6 of the July 1, 1965 Applied Physical Letters, vol. 7, No. 1. However, that configuration has a number of disadvantages. For example, it is most difficult to attain a sufficiently good seal in the plastic structure and as a result, a continuous flow of laser gas is a virtual necessity. Additionally, the rectangular configuration does not lend itself to fabrication as readily as a circularly symmetrical form. Another detraction of the use of plastic as contrasted to glass is that plastic tends to "outgas" and contaminate the gas laser medium.

The present invention overcomes these and other disadvantages by employing a circular glass laser tube which can be readily sealed, does not contaminate and is readily constructed.

Accordingly, it is a primary object of the present invention to significantly minimize the inherent limitations of prior art pulsed gas laser systems.

Another primary object of the present invention is to provide a pulsed gas laser wherein the system is conceived and adapted to operate substantially in the manner of an electrical transmission line.

A concomitant primary object of the present invention is to provide a pulsed gas laser having a short pulse, moderately high peak power and a high pulse repetition frequency which can be embodied in relatively small, portable equipment.

Another important object of the present invention is to provide a pulsed gas laser having predetermined distributed impedance characteristics which facilitate the realization of an extremely large rate of rise of current at the start of the electrical pulsing.

A further object of the present invention is to provide a pulsed gas laser in which a transmission line for impressing electrical energy upon the laser comprises coaxial cables.

Yet another object of the present invention is to provide a pulsed gas laser system having overall electrical characteristics which are substantially those of a transmission line of the coaxial cable type and wherein the laser gas is enclosed in a member including electrodes and an electrically-conductive sheath for electrical conduction through the gas substantially in the manner of the extension of a coaxial transmission line.

Yet a further object of the present invention is to provide a pulsed gas laser of a configuration operating as a continuation of a coaxial transmission line which is divided into several operative portions to effect optimal efficiency relative to the velocity of the excitation wave in the laser gas.

In its most fundamental form the pulsed gas laser of the present inventive concept may comprise a source of electrical energy and an electrical switch means having a transmission line of predetermined electrical characteristics connected therebetween. The electrical switch means may take the form of a spark gap switch, for example. A gas laser may be enclosed within a glass tube, for example, which has electrodes communicating with its interior at two or more separated positions. The laser assembly will preferably also include an electrically conductive sheath substantially enclosing the glass tubing and connected to at least one of the electrodes.

In a preferred embodiment of the present invention the several electrodes communicating with the interior of the gas laser assembly may comprise rings of conductive material sealed into the glass tubing, with one such ring conductor centrally located and two additional ring electrodes equally displaced on either side of the centrally located ring electrode. The centrally located ring electrode is preferably connected to the enclosing conductive sheath while the two other displaced ring electrodes are connected to appropriate electrical conductors connecting the assembly with the switch means.

When the switch means becomes conductive by reason of the build-up of sufficient electrical potential to jump a spark gap, for example, the gas within the gas laser assembly and the enclosing sheath operate substantially as the inner and outer conductors of a coaxial transmission line connected from the source of electrical energy to the electrical switch means.

Accordingly, when the electrical characteristics of the described circuit are selectively determined relative to the predetermined electrical characteristics of the transmission line connecting the source of electrical energy to the switch means the most desirable distributed impedance for the circuit is achieved providing a minimum loss of power by reason of unwanted voltage drop and a consequent desirably steeply rising pulse of current.

Consequently, a commensurately high rate of current rise is realized in a minimum time with a relatively short pulse at high peak power and at a high pulse repetition frequency. Additionally, the use of coaxial cables which are flexible and adapted to being moved about readily, makes it possible to embody the concepts of the present invention in comparatively small equipments that may be transported as required or as desirable. These advantages of the present invention make its concept particularly useful in high resolution laser radars, coded signaling devices, and equipments having similar operative characteristics.

These and other objects, advantages and features of the present invention will be better understood from the following description of an embodiment of the present invention and its scope will be pointed out in the appended claims.

A fundamental aspect of the concept of the present invention is to provide a pulsed gas laser equipment wherein the electrical circuit is completed through a combination of elements operating substantially in the manner of a transmission line for electrical energy and each of the discrete elements in the combination is so designed, adapted and chosen as to operate substantially as a continuation or extension of the next contiguous portion of the circuit. Thus, it should be appreciated that inherent in the concept of the present invention is the requirement that the laser tube assembly operate preferably in the manner of a coaxial cable transmission line as has previously been described.

Figure 1:
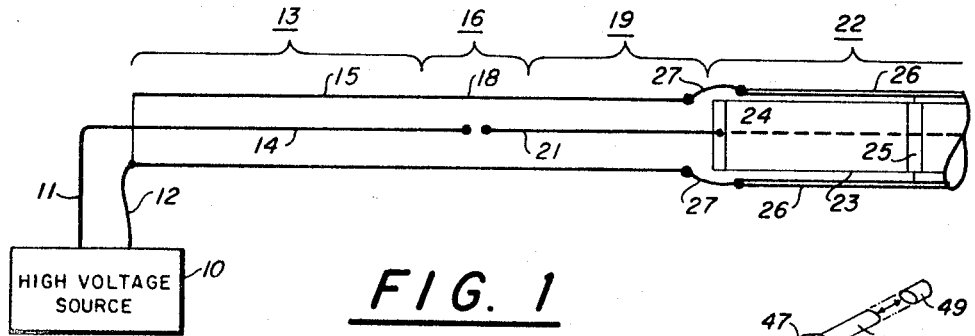
FIG. 1 is a schematic illustration of the concept of the present invention.

The illustration of FIG. 1 shows such a concept in a schematic form. A high voltage source 10 having two output terminals 11 and 12 are connected to two conductive portions of an energy storage means 13. The energy storage means 13 may comprise an appropriate length of coaxial cable having an inner conductor 14 connected to one terminal of the high voltage source 10 and an outer conductor 15 connected to the other terminal 12 of the high voltage source 10.

An electrical switch means is provided as indicated at 16 and shown in its open position. Such an electrical switch adapted to use in the present invention may comprise an appropriate spark gap selected to offer an appropriate impedance to the flow of current; until a sufficiently high energy storage of high voltage is reached. Upon achieving that state, the energy potential stored in the energy storage means 15 overcomes the impedance of the spark gap at 17 and permits the flow of current an appropriate conductor 18 is provided as part of the switch means 16 to connect the switch means 16 with the outer conductor 15 of the energy storage means 13, which in the usual case will be at ground potential.

Electrical leads 19 connect the switch means 16 to the laser tube assembly. The electrical leads 19 in a typical embodiment may also conveniently comprise transmission lines in the form of coaxial cable having an outer conductor 20 and an inner conductor 21. The laser tube assembly 22 may include an enclosed glass tube 23 having sealed therein a plurality of electrodes communicating with its interior such as the electrodes shown at 24 and 25. In a typical preferred embodiment of the present invention the electrodes 24 and 25 may comprise copper rings sealed to the glass tubing 23 and may be three in number so that the ring electrode 25 would be centrally located and a displaced ring electrode such as shown at 24 displaced either side of the central ring electrode 25.

A sheath of conductive material 26 is arranged to substantially enclose the major portion of the laser tube assembly as shown. The electrically conductive sheath 26 is electrically connected to the central ring electrode 25 and also is connected to the outer condutor 20 of the electrical leads 19 by appropriate conductive leads 27. It will be noted that the outer conductive sheath substantially enclosing the laser tube assembly as shown at 26 is appropriately arranged so as not to be in contact with the laterally displaced ring electrode 24.

The laterally displaced ring electrode 24, which is adjacent the end of the laser tube assembly, is electrically connected through an appropriate lead to the inner conductor 21 of the electrical connector 19 and thus receives the high potential stored in the energy storage means 15 when the switch means in the form of the spark gap 16 becomes conductive.

Accordingly, the gas plasma 28 of the gas laser assembly operates in the manner of the central conductor of a coaxial cable connected to the electrical leads 19 and the electrically conductive outer sheath 26 operates in the manner of the outer conductor of a coaxial cable transmission line when the switch means 16 becomes conductive, connecting the laser tube assembly to the high potential energy stored in the energy storage means 16. Effectively, therefore, the entire system operates substantially in the manner of an integrated transmission line for electrical energy with the result that an extremely high rise time of initial rate of current flow is realized for the more efficient energization of the gas laser material.

Figure 2:
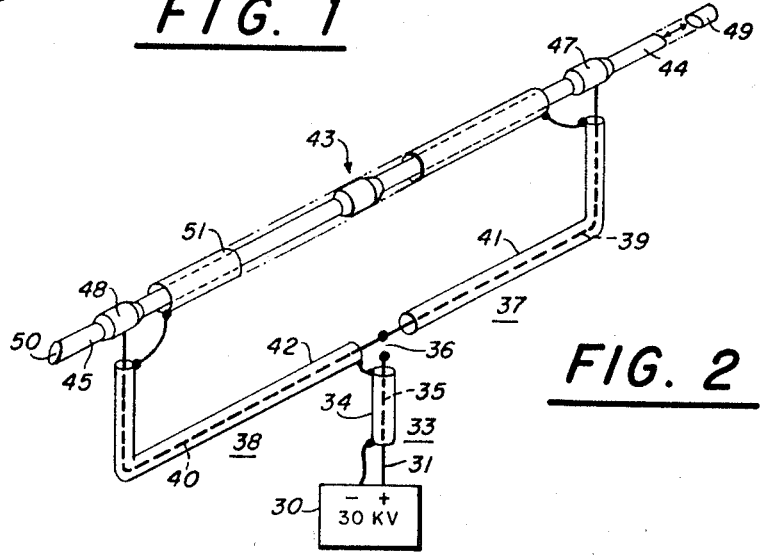
FIG. 2 is a perspective schematic illustration of an embodiment of the present invention.

FIG. 2 illustrates in perspective schematic drawing an embodiment of the concept displayed and explained in connection with FIG. 1. In FIG. 2 a high voltage source 30 is shown as having a high potential terminal 31 and a ground potential 32 connected to a length of coaxial transmission line 33. The coaxial transmission line 33 comprises an outer conductor 34 connected to the ground potential of the high voltage source 32 while the inner conductor 35 is connected to the high potential side 31 of the high voltage source 30.

A coaxial spark gap switch 36 is connected between the coaxial line 33 and two connecting conductors 37 and 38, which completes an electrical path to the laser tube assembly 43. The connecting cables 37 and 38 may preferably be comprised of like lengths of coaxial cable having inner conductors 39 and 40, respectively, and outer conductors 41 and 42, respectively. The inner conductors 39 and 40 are connected to the high potential of the spark gap 36 while the outer conductors 41 and 42 are connected to the outer, low potential conductor 34 of the coaxial line 33. The gas laser tube assembly 43 may comprise a length of glass tubing appropriately arranged and adapted to support three sealed copper ring electrodes communicating with its interior. One of the ring electrodes 46, is centrally located and the other two ring electrodes 47 and 48 equally displaced laterally near the ends 44 and 45, respectively, of the gas laser tube 43.

The outer conductor 41 of the connecting cable 37 is connected to a sheath 51 of electrically conductive material which substantially encloses a major portion of the gas laser tube assembly 43. In a similar manner, the outer conductor 42 of the connecting cable 38 is connected to the opposite end of the electrically conductive sheath 51 which may typically be fabricated of silver braided shield.

The inner, high potential conductors 39 and 40 of the connecting cables 37 and 38, respectively, are connected to the laterally displaced ring electrodes 47 and 48, respectively. The glass laser tube assembly 43 is appropriately sealed at its ends to contain a gas such as nitrogen and a mirror as illustrated at 49 may be placed at one end of the gas laser assembly to reflect energy back into the tube so that maximum energy may be emitted at the other end of the tube 50.

When the high potential inner conductor 35 of the laser transmission line 33, is effectively connected to the inner conductors 39 and 40 of the connecting cables 37 and 38 by reason of the coaxial spark gap 38 becoming conductive, a high electrical potential is impressed upon the gas within the gas laser assembly from the copper ring electrodes 47 and 48 to the substantially ground potential existing at the copper ring electrode 46. The gas laser material thus becomes conductive along paths in opposite directions as indicated by the arrows within the gas laser tube assembly of FIG. 2; the gas within the tube functions electrically in the manner of the central conductor of a length of coaxial line, while the electrically conductive sheath substantially enclosing the major portion of the gas laser assembly functions in the manner of the outer conductor of a coaxial transmission line. Accordingly, the entire system operates substantially in the manner of connected, continuous extensions of a coaxial transmission line with the highly desirable result of effecting distributed impedance, reducing voltage loss due to inductive reactance, and producing a significantly sharper rise time as evidenced by a high rate of rise in current flow.

Figure 3:
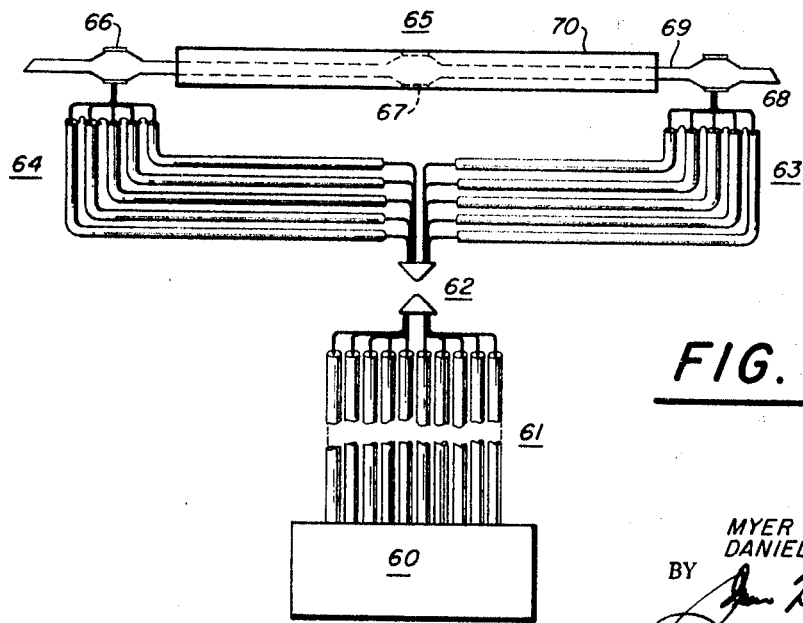
FIG. 3 is a schematic illustration of a preferred embodiment of the present invention.

FIG. 3 illustrates a preferred embodiment of the present invention. In FIG. 3 a source of high voltage electrical energy such as that illustrated at 60 is provided and may typically comprise a 30 kilovolt power supply. The transmission line for transmitting high voltage electrical energy from the power supply 60 may comprise ten lengths of coaxial cable 61 arranged and connected in parallel. Suitable coaxial cable in an actual embodiment might comprise equal sections of RG58C/U cable which produces a combined characteristic impedance of approximately 5 ohms. A coaxial spark gap switch 62 is provided which also has desirably a characteristic impedance of 5 ohms and is arranged so the central conductors of the ten coaxial cables 61 connected in parallel are connected to one side of the coaxial spark gap switch 62.

Two sets of five cables each 63 and 64 which may comprise like lengths of coaxial cable are provided to connect the opposite side of the coaxial spark gap switch 62 to the gas laser tube assembly 65. The gas laser tube assembly 65 may comprise a glass body having three electrically conductive ring electrodes 66, 67 and 68 sealed therein to communicate with its interior.

The glass laser member 69 is sealed to contain an appropriate gas laser material such as nitrogen gas. The gas laser assembly 65 is enclosed within an electrically conductive sheath 70 which may preferably comprise a silver braided material. The central copper ring electrode 67 sealed within the gas laser tube assembly 65 is connected to the electrically conductive silver braid sheath 70. On either end of the silver braid sheath, the five outer conductors of each set of the connecting cables 63 and 64 are electrically connected in common and to the electrically conductive sheath so that two sets of five connecting cables and the silver braid sheath of the gas laser assembly are all electrically connected in circuit.

Five of the inner conductors of the connecting cables 63 are connected to one copper ring electrode 68 disposed at one end of the gas laser tube assembly 65, while the remaining five inner conductors of the connecting cables 64 are connected to the remaining copper ring electrode 66 disposed at the other end of the gas laser tube assembly 65.

Thus, the high potential inner conductors of the connecting cables 63 and 64 are connected to the two laterally displaced copper ring electrodes 68 and 66. As shown and described the laser tube assembly 65 constitutes a virtual continuation of the coaxial transmission line sections 61, 63 and 64 with the silver braid sheath 70 surrounding the complete discharge length serving as an outer conductor and the discharge plasma contained within the gas laser tube assembly 65 serving as a central conductor. The inside diameter and the outside diameter of the glass tubing are chosen to match the characteristic nanosecond pulse to the plasma tube although this length of the storage cables 61 is selected to give a nominal 50 nanosecond pulse of the plasma tube although this length has been found not to be particularly critical.

The laser light pulse at optimum gas pressure was found to be seven nanoseconds in duration as compared with a pulse duration of twenty nanoseconds achieved with prior art arrangements. The shorter pulse duration which is realized with the present invention with reasonably high peak power indicates higher gain in the laser oscillator and significantly more efficient pumping of energy.

The transmission line laser configuration of the present invention has a capability of producing very large initial rates of current rise which is vitally necessary for the most efficient utilization of active laser molecules. By contrast, conventional capacitor discharge methods of the prior art would not normally produce sufficient rates of current rise for equivalent laser action.

For a representative nitrogen laser it has been shown that the initial value of current rise is required to be $3 \times 10^{11}$ amps per second in a laser tube nominally of one square centimeter in cross section. Assuming that the capacitor and the connections to the plasma tube have a nominal inductance value of 100 nanohenries, a voltage drop of 30,000 volts will be produced, requiring a significantly larger initial power supply. This was one of the principal difficulties encountered in the configurations and arrangements of the prior art which have been significantly minimized and substantially overcome by the concept of the present invention.

Moreover, the transmission line laser configuration as conceived by the present invention provides a most convenient method of controlling the pumping pulse width to prevent the dumping of electrical energy into the discharge after the laser pulse has terminated. This operation is most important in minimizing heating effects when the laser is operated at high repetition pulse rates. Moreover, energy pumping after the light pulse has ended, increases the time required for molecules to return to the ground state which, in turn, also limits the repetition rate.

As yet another advantage the transmission line laser configuration may employ relatively inexpensive coaxial cable for low inductance energy storage at a cost which is significantly lower than the cost of an equivalent storage capacitor.

Added to these features are the inherent characteristics of operation of the transmission line laser configuration of the present invention which can be made to provide a short pulse at moderately high peak powers, at a high pulse repetition frequency and embodied in relatively small and conveniently transportable equipments.

The concept of the present invention can be embodied in cylindrical glass laser assemblies which are relatively easily fabricated, can be sealed to obviate the necessity of a continuous flow of laser gas, and do not "outgas" as plastic assemblies do nor contribute to impurities by deterioration due to the hot plasma discharge.

Overall, these numerous features, advantages, and characteristics of operation make the concept of the present invention most useful in high resolution laser radars, coded signaling devices and equipments requiring comparable performance characteristics.

Obviously many modifications and variations of the present invention are possible in the light of the above teachings. It is therefore to be understood that within the scope of the appended claims the invention may be practiced otherwise than as specifically described.

What is claimed is:

1. A pulsed gas laser comprising:
   a source of electrical energy;
   an electrical switch means;
   a transmission line of predetermined electrical characteristics connected between said source of electrical energy and said switch means;
   a gas laser having electrodes communicating with the interior thereof at two or more separated positions;
   an electrically conductive sheath substantially enclosing said laser and connected to at least one of said electrodes; and
   electrical conductors connecting said switch means, said electrodes, and said sheath for completing a circuit through the gas of said laser when said switch means is rendered conductive,
   the electrical characteristics of said circuit being selectively determined relative to said predetermined electrical characteristics for operating as a continuation of said transmission lines,
   whereby to minimize impedance to the rate of increase of electrical current flow to said laser electrodes.

2. A pulsed gas laser as claimed in claim 1 wherein the predetermined electrical characteristics of said transmission line comprise a selected distributed impedance.

3. A pulsed gas laser as claimed in claim 1 wherein said transmission line comprises a plurality of parallel connected coaxial cables.

4. A pulsed gas laser as claimed in claim 3 wherein the length of said coaxial cables is selected to produce an electrical pulse of desired duration when said switch means is rendered conductive.

5. A pulsed gas laser as claimed in claim 3 wherein said electrical switch means comprises a spark gap of determinable impedance.

6. A pulsed gas laser as claimed in claim 5 wherein said electrical conductors comprise a plurality of coaxial cables.

7. A pulsed gas laser as claimed in claim 1 wherein said laser electrodes comprise one central and two equally displaced conductive ring electrodes.

8. A pulsed gas laser as claimed in claim 6 wherein an equal number of the inner conductors of coaxial cables connect said switch means to said two equally displaced conductive ring electrodes and the outer conductors of said coaxial cables are connected to said central conductive ring electrode.

9. A pulsed gas laser as claimed in claim 8 wherein said electrically conductive sheath, said ring electrodes, and said laser gas are adapted to conduct electrical energy substantially as a continuation of a coxial transmission line.

10. A pulsed gas laser as claimed in claim 8 wherein said laser comprises glass tubing containing said gas and dimensioned to match the impedance of said coaxial cables.

References Cited

Donald A. Leonard, Applied Physics Letters, vol. 7, No. 1, July 1, 1965, pp. 4–6.

JOHN KOMINSKI, Primary Examiner